Aug. 27, 1963     E. F. SHELLEY ETAL     3,101,628
POTENTIOMETER POSITION CONTROL APPARATUS
Original Filed July 2, 1959
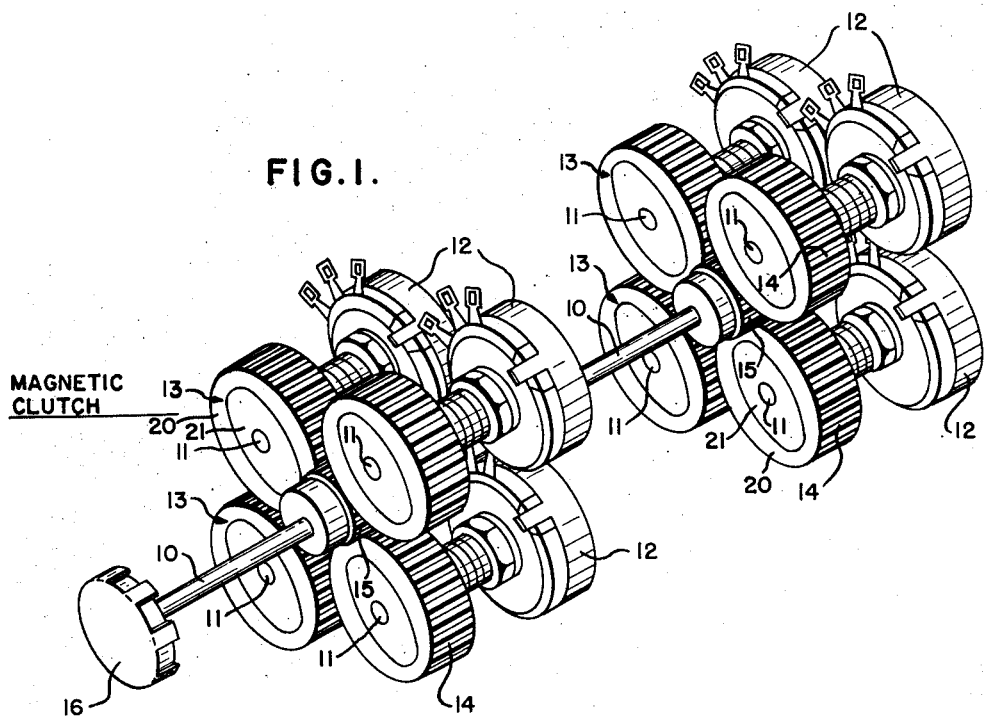
FIG. 1.
FIG. 2.
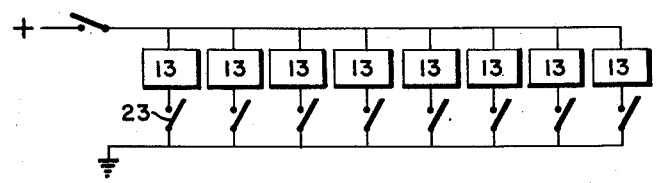
INVENTORS
Edwin F. Shelley
George A. Jonas
Sidney Weiser
ATTORNEYS United States Patent Office 3,101,628
Patented Aug. 27, 1963

3,101,628
POTENTIOMETER POSITION CONTROL APPARATUS
Edwin F. Shelley, New Rochelle, N.Y., and George A. Jonas, Bethesda, and Sidney Weiser, Silver Spring, Md., assignors to U.S. Industries, Inc., New York, N.Y., a corporation of Delaware
Original application July 2, 1959, Ser. No. 824,611, now Patent No. 3,007,097, dated Oct. 31, 1961. Divided and this application June 6, 1960, Ser. No. 34,133
2 Claims. (Cl. 74—665)

This application is a division of co-pending application Serial No. 824,611, filed July 2, 1959, and now Patent No. 3,007,097, and assigned to the same assignee as the present application.

The present invention relates to apparatus for angularly positioning the rotatable shafts of control devices such as potentiometers, and more particularly to single-shaft control apparatus for angularly positioning the rotatable shaft of a selected one of a plurality of such devices.

Continuously variable control devices such as potentiometers have been used in increasingly greater numbers in automation systems, particularly in computer systems and electro-mechanical servo systems and the like. Both single-turn and multiple-turn potentiometers, for example, have been employed to good advantage in such systems as information storage devices and the like. The above-referenced application describes automatic handling and assembly apparatus which employs a number of potentiometers for storing a work program to be carried out by a plurality of co-operating electro-mechanical servo-mechanisms. Electrically energized potentiometers, which are preset by an operator, provide desired command-position signals for associated follow-up type servo-motor position control apparatus. In complex automation systems of this type, it is important to provide the human operator with controls which will facilitate rapid and accurate programing of the machine and which will also minimize errors due to unintended movement of the potentiometers after they have been set to desired positions.

It is a principal object of the present invention, therefore, to provide a simple and reliable single-shaft-control assembly for selectively positioning any one of the rotatable shafts of a plurality of associated control devices such as potentiometers. A more complete understanding of the invention may be had by reference to the following description considered in connection with the illustrative embodiment shown in the accompanying drawing in which:

FIG. 1 is a perspective view showing a preferred embodiment of the apparatus provided by the invention, and FIG. 2 is a schematic diagram of the magnetic clutch circuitry.

A single centrally disposed rotatable drive shaft 10 is provided for angularly positioning the rotatable shafts 11 of potentiometers 12. As shown in the drawing, eight potentiometers are disposed circumferentially around the drive shaft in two sets of four each with the rotational axes of the potentiometer shafts being disposed in parallel relationship with the rotational axis of the control drive shaft. For purposes of simplifying the drawing, mounting plates for the potentiometers are not shown. Mechanical coupling between the control shaft 10 and each of the potentiometer shafts 11 is effected by electrically energizable magnetic clutches 13. These clutches may be any one of several well-known types. Those shown in the drawing are low torque frictional clutches which are actuated by electrically energizable solenoids (not shown). The outer cylindrical member 20 of each clutch is fitted with a toothed gear ring 14 which is adapted to mesh with a driving gear 15 secured to the control shaft 10, thereby drivingly connecting member 20 to the shaft 10. The internal member 21 of each clutch is securely coupled to the shaft of an associated potentiometer. When a clutch is electrically energized by closing its associated switch 23 shown in FIG. 2, thereby applying to the clutch an electric potential through a conventional brush and slip-ring combination (not shown) or by equivalent means, the shaft of the associated potentiometer may then be rotated by turning knob 16 attached to the end of shaft 10. Thus the eight potentiometers disposed circumferentially around the control shaft may be simultaneously or separately and individually positioned by selectively energizing the appropriate clutches and rotating the control shaft. Although eight potentiometers are shown in the drawing, it is to be understood that potentiometers may be added to the assembly or removed therefrom as required. Furthermore, it is to be understood that in certain instances the central control shaft may be advantageously driven by a reversible motor rather than manually operated.

One of the outstanding advantages of the apparatus provided by the invention resides in the mechanical isolation afforded between the main control shaft and each potentiometer shaft. After the potentiometers are preset to the respective desired positions and the clutches are de-energized, the control shaft can be rotated freely without disturbing any of the potentiometer settings. The advantage of this safety feature in preventing costly errors due to inadvertent movement of positioned potentiometers by the operator will be apparent to those skilled in the art. A further advantage offered by the improved apparatus and arrangement thereof in accordance with the invention is the relatively small space required for mounting on a central panel.

A single preferred embodiment of the invention has been shown and described. It will be apparent that various changes and modifications may be made within the scope of the invention and the appended claims.

We claim:

1. Apparatus for angularly positioning any one of a plurality of rotatable control shafts provided to operate a plurality of control devices, comprising a single centrally located drive shaft for positioning the shafts of said control devices, said drive shaft being movable only in rotation, a first set of control devices comprising a plurality of control devices circumferentially located about said drive shaft, a second set of control devices comprising a plurality of control devices circumferentially located about said drive shaft and spaced along said drive shaft from said first set, each of said devices having a rotatable control shaft operatively associated therewith, a plurality of electro-magnetically actuated clutches, one for each of said control devices, each of said clutches having a pair of members and each of said clutches being adapted to be individually energized, a member of each of said clutches being securely coupled to the shaft of a control device, and means drivingly connecting a second member of each of said clutches to the said drive shaft, whereby the shaft of any individual control device may be rotatably positioned by individually energizing the clutch associated with that control device.

2. Apparatus as set forth in claim 1 in which said control devices are potentiometers.

References Cited in the file of this patent
UNITED STATES PATENTS

| | | |
|---|---|---|
| 750,370 | Kammerer | Jan. 26, 1904 |
| 1,598,146 | McKenzie | Aug. 31, 1926 |
| 1,660,278 | Schwarze | Feb. 21, 1928 |
| 2,466,080 | Cook et al. | Apr. 5, 1949 |
| 2,984,137 | Wilson | May 16, 1961 |